United States Patent [19]
Ninomiya et al.

[11] Patent Number: 5,498,917
[45] Date of Patent: Mar. 12, 1996

[54] STATOR FOR MOTOR

[75] Inventors: Yuji Ninomiya; Kenji Ueyama, both of Saitama, Japan

[73] Assignee: Kabushiki Kaisha Yaskawa Denki, Fukuoka, Japan

[21] Appl. No.: 211,391

[22] PCT Filed: Jul. 26, 1993

[86] PCT No.: PCT/JP93/01040

§ 371 Date: Jun. 7, 1994

§ 102(e) Date: Jun. 7, 1994

[87] PCT Pub. No.: WO94/02982

PCT Pub. Date: Feb. 3, 1994

[30] Foreign Application Priority Data

Jul. 27, 1992 [JP] Japan ..................... 4-220797

[51] Int. Cl.⁶ ........................................ H02K 1/00
[52] U.S. Cl. ........................................ 310/216; 310/254
[58] Field of Search ..................... 310/49 R, 51, 310/162–165, 254, 258, 259, 216, 217, 190–193

[56] References Cited

U.S. PATENT DOCUMENTS

| | | | |
|---|---|---|---|
| 1,538,196 | 5/1925 | Livingston | 310/216 X |
| 2,711,008 | 6/1955 | Smith | 310/216 X |
| 2,981,856 | 4/1961 | Ludemann et al. | 310/216 X |
| 3,353,046 | 11/1967 | Papst | 310/216 X |
| 3,869,629 | 3/1975 | Ogawa et al. | 310/216 |
| 4,719,382 | 1/1988 | Listing | 310/216 X |
| 4,782,260 | 11/1988 | Gandhi et al. | 310/216 |

FOREIGN PATENT DOCUMENTS

| | | |
|---|---|---|
| 55-145852 | 10/1980 | Japan . |
| 56-35665 | 4/1981 | Japan . |
| 61-108045 | 7/1986 | Japan . |

*Primary Examiner*—Mark O. Budd
*Attorney, Agent, or Firm*—Mark Catan; Thomas R. Morrison; Alfred W. Froebrich

[57] ABSTRACT

A stator for a motor in which there are provided a ring-shaped yoke portion iron core (2), tooth portion iron cores (3) arranged at an equal interval on the inner circumferential side of the yoke portion iron core (2), stator coils (5) fitted into slots (4) formed between respective adjacent tooth portion iron cores (3), and bridging portions (31) connecting the inner circumferential sides of the respective adjacent tooth portion iron cores (3), and a rotor (6) is oppositely disposed through a gap on the inner circumferential side of the tooth iron cores (3), thus allowing the ratio of length s in a circumferential direction of the bridging portion (31) to pitch p in the circumferential direction of the tooth portion iron cores (3) to fall within a range of 0.01 to 0.20.

Accordingly, the cogging torque of a motor can be lowered without lowering EMF.

17 Claims, 2 Drawing Sheets

STATOR FOR MOTOR

TECHNICAL FIELD

This invention relates to a stator for a motor comprised of laminated iron cores.

BACKGROUND ART

Hitherto, there is known a stator for a motor, which is constituted with a ring-shaped yoke portion iron core, tooth portion iron cores arranged at an equal interval on the inner circumferential side of the yoke portion iron core, and stator coils fitted into slots formed between respective adjacent tooth portion iron cores, wherein a rotor is oppositely disposed through a gap on the inner circumferential side of the tooth portion iron cores. In this case, there is disclosed a stator core in which the inner circumferential sides of respective adjacent tooth portion iron cores are connected by portions serving as a bridge between magnetic poles (hereinafter simply referred to as bridging portions) having a small cross section in order not to take the stator assembly to pieces at the time of punching or assembling of tooth portion iron cores and yoke portion iron core, and to reduce leakage reactance (e.g., the Japanese Patent Application Laid Open No. 196034/1987 (Tokkaisho No., 82-196034), the,Japanese Patent Application Laid Open No. 174531/ 1988 (Tokkaisho No. 63-174531).

However, with the above-described configuration, there were the drawbacks that the cogging torque cannot be sufficiently small and/or unevenness of the cogging torque becomes greater in dependency upon the dimensions of tooth portion iron cores employed.

DISCLOSURE OF THE INVENTION

An object of this invention is to provide a stator for a motor, which has small cogging torque.

This invention is directed to a stator for a motor comprising a ring-shaped yoke portion iron core, tooth portion iron cores arranged at an equal interval on the inner circumferential side of the yoke portion iron core, stator coils fitted into slots formed between respective adjacent tooth portion iron cores, and bridging portions for connecting the inner circumferential sides of the respective adjacent tooth portion iron cores, a rotor being oppositely disposed through a gap on the inner circumferential side of the tooth portion iron cores, characterized in that the ratio of the length in a circumferential direction of the bridging portion to a pitch in the circumferential direction of the tooth portion iron core falls within a range of 0.01 to 0.20. Further, the ratio of the thickness in a radial direction of the bridging portion to the thickness of laminated steel plates of the tooth portion iron core falls within the range of 0.2 to 1.0.

According as the ratio $\alpha$ of the length s in a circumferential direction of the bridging portion connecting adjacent tooth portion iron cores to the pitch p in the circumferential direction of the tooth portion iron core becomes smaller, the amplitude of the cogging torque becomes smaller. When the ratio $\alpha$ exceeds 0.2, the amplitude of the cogging torque suddenly increases. Further, by change of the dimensions of the bridging portion, induced electromotive force (EMF) slightly becomes greater according as the ratio $\alpha$ becomes greater.

Further, according as the ratio $\beta$ of the thickness b in a radial direction of the bridging portion to the thickness t of the laminated steel plates of the tooth portion iron core becomes greater, the amplitude of the cogging torque becomes smaller and MF becomes smaller at the same time. Accordingly, in accordance with this invention, by selecting optimum ranges of the ratios $\alpha$ and $\beta$, it is possible to advantageously lower the cogging torque of motor without lowering EMF.

BEST MODE FOR CARRYING OUT THE INVENTION

This invention will now be described in connection with the embodiment shown.

Figure 1:
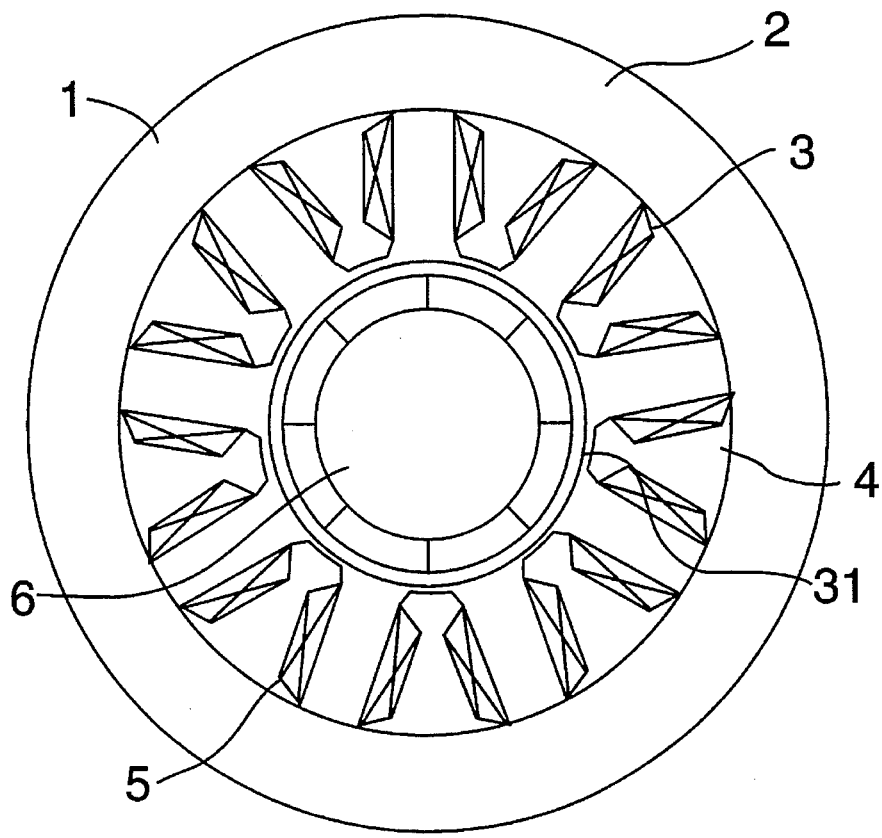
FIG. 1 is a front cross sectional view showing an embodiment of this invention.

FIG. 1 is a front cross sectional view showing the embodiment of this invention. A stator 1 is composed of a ring-shaped yoke portion iron core 2, tooth portion iron cores 3 arranged at an equal interval on the inner circumferential side of the yoke portion iron core 2, and stator coils 5 fitted into slots 4 formed between respective adjacent tooth portion iron cores 3. The inner circumferential sides of respective adjacent tooth portion iron cores 3 are connected by bridging portions 31 having a small cross section, and a rotor 6 is oppositely disposed through a gap on the Inner circumferential side of the tooth portion iron cores 3.

Figure 2:
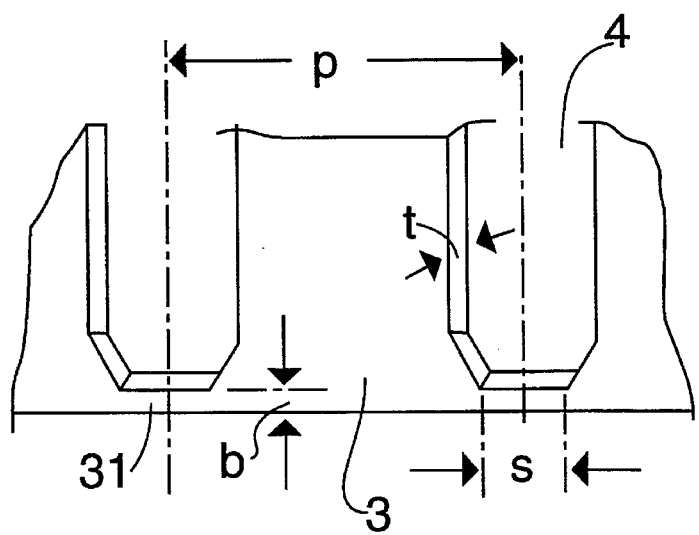
FIG. 2 is a perspective view showing tooth portion iron core and bridging portion.
Figure 3:
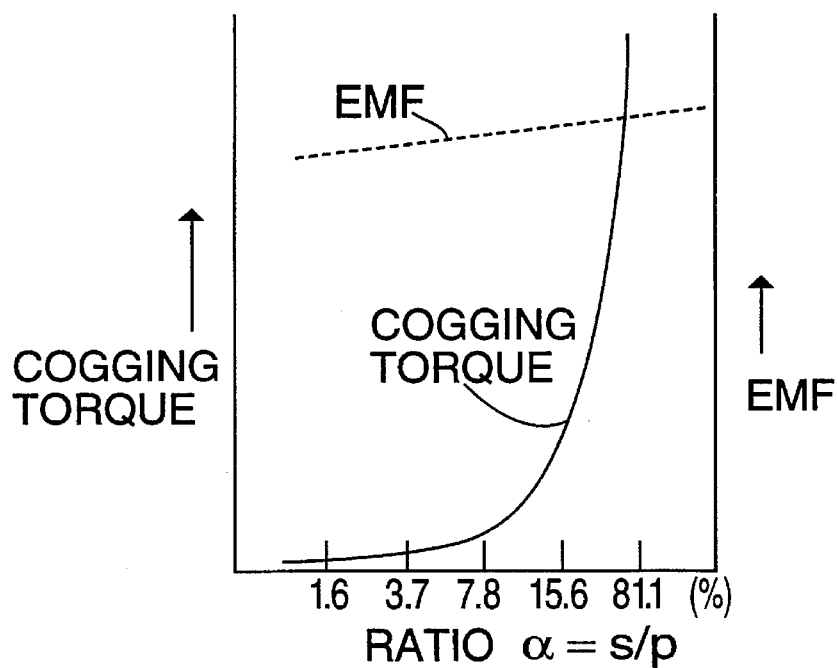
FIG. 3 is an explanatory view showing the relationship between ratio $\alpha$ and cogging torque.

In this case, the cross section of a synchronous motor in the case where rotor pole number P is 8 and stator slot number Ns is 9 is shown. It is considered that with respect to the fundamental frequency component of the cogging torque, the peak of a frequency component corresponding to 72 which is least common denominator of 8 end 9 is the main component, so the cogging torque must be smaller. However, when experiment is conducted by varying the dimensions of bridging portion 31 and the pitch of tooth portion iron core 3, there are instances where the peaks of frequency components corresponding to 8 and 9 of the cogging torque are major components, so the cogging torque may increase. In this experiment, when dimensions of tooth portion 3 and bridging portion 31 are determined as shown in FIG. 2, it has been found that, as shown in FIG. 3, according as the ratio $\alpha$ of length s in a circumferential direction of bridging portion 31, to pitch p in the circumferential direction of tooth portion iron core 3 becomes smaller, the amplitude of the cogging torque becomes smaller, but when the ratio $\alpha$ exceeds 0.2, the amplitude of the cogging torque suddenly increases.

In this case, there is a tendency that according as the ratio $\alpha$ increases, the induced electromotive force (EMF) slightly becomes larger in dependency upon change of the dimension of the bridging portion 31. Accordingly, it is considered that the ratio $\alpha$ is preferably in the range of 0.01 to 0.20.

Figure 4:
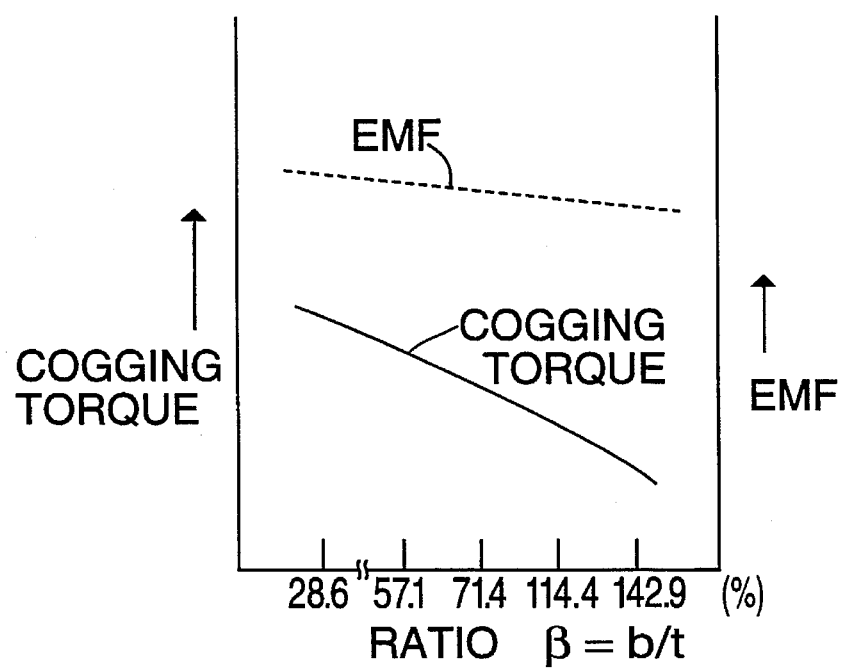
FIG. 4 is an explanatory view showing the relationship between ratio $\beta$ and cogging torque.

Further, as shown in FIG. 4, according as the ratio $\beta$ of thickness b in a radial direction of bridging portion 31 to the thickness t of laminated steel plates of tooth portion iron core 3 becomes greater, the cogging torque decreases to much more degree. However, because EMF also has a tendency to decrease at the same time, it is desirable that the ratio β is in the range of 0.2 to 1.0.

By allowing the dimension of bridging portion 31 to be in the ranges of the ratios α and β mentioned above, the cogging torque was lowered by 40–70% as compared to the case of open slot having no bridging portion.

Industrial Applicability

This invention can be utilized in the field for manufacturing and providing a high performance motor when applied to a stator for a motor, which is comprised of laminated iron cores.

What is claimed is:

1. A stator for a motor, comprising:
   a ring-shaped yoke portion iron core;
   tooth portion iron cores arranged at equal intervals on an inner circumferential side of the yoke portion iron core;
   stator coils fitted into slots formed between respective adjacent tooth portion iron cores;
   bridging portions connecting the inner circumferential sides of the respective adjacent tooth portion iron cores; and
   a rotor oppositely disposed through a gap on the inner circumferential sides of the tooth portion iron cores,
   said bridging portions being substantially continuous in circumferential and axial directions and having a region of substantially uniform thickness in a radial direction,
   a ratio of a length in a circumferential direction of the region to a pitch in the circumferential direction of the tooth portion iron cores being within a range of 0.01 to 0.20.

2. A stator for a motor as set forth in claim 1, wherein a ratio of a thickness in a radial direction of the bridging portion to a thickness of laminated steel plates of the tooth portion iron cores falls within a range of 0.2 to 1.0.

3. An armature for a motor, comprising:
   a ring-shaped yoke portion iron core;
   tooth portion iron cores arranged at an equal interval on the inner circumferential side of the yoke portion iron core;
   coils fitted into slots formed between respective adjacent tooth portion iron cores;
   bridging portions for connecting the inner circumferential sides of the respective adjacent tooth portion iron cores;
   a rotor oppositely disposed through a gap on the inner circumferential side of the tooth portion iron cores;
   the ratio of the length in a circumferential direction of the bridging portion to a pitch in the circumferential direction of the tooth portion iron cores being caused to fall within a range of 0.01 to 0.20; and
   the ratio of the thickness in a radial direction of the bridging portion to the thickness of laminated steel plates of the tooth portion iron core falls within a range of 0.2 to 1.0.

4. A stator as in claim 3, wherein said motor is a synchronous motor.

5. A stator as in claim 3, wherein said tooth portion iron cores are nine in number.

6. A stator as in claim 5, wherein said rotor has eight poles.

7. A stator as in claim 1, wherein the bridging portion have respective cross sections and said cross sections are smaller than said length in said circumferential direction.

8. A stator as in claim 7, wherein said motor is a synchronous motor.

9. A stator as in claim 8, wherein said tooth portion iron cores are nine in number.

10. A stator as in claim 9, wherein said rotor has eight poles.

11. A motor, comprising:
    a ring-shaped yoke portion iron core;
    tooth portion iron cores on a circumferential surface of the yoke portion iron core;
    coils in slots between adjacent ones of the tooth portion iron cores;
    bridging portions connecting ends of the adjacent ones of the tooth portion iron cores;
    said bridging portions being substantially continuous in circumferential and axial directions and having a region of substantially uniform thickness in a radial direction,
    a rotor spaced a distance from said tooth portion iron cores; and
    a ratio of the thickness in a radial direction of the bridging portion to a thickness of laminated steel plates of the tooth portion iron cores falling within a range of 0.2 to 1.0.

12. A motor as in claim 11, wherein said rotor is an internal rotor so that said rotor is surrounded by said tooth portion iron cores.

13. A stator as in claim 12, wherein said bridging portions are substantially uninterrupted so as to form a substantially continuous magnetic flux circuit between said adjacent tooth portion iron cores.

14. A motor, comprising:
    a ring-shaped yoke portion iron core;
    tooth portion iron cores arranged at an equal interval on the inner circumferential side of the yoke portion iron core;
    coils fitted into slots formed between respective adjacent tooth portion iron cores;
    bridging portions for connecting the inner circumferential sides of the respective adjacent tooth portion iron cores;
    a rotor oppositely disposed through a gap on the inner circumferential side of the tooth portion iron cores;
    the ratio of the length in a circumferential direction of the bridging portion to a pitch in the circumferential direction of the tooth portion iron cores being caused to fall within a range of 0.01 to 0.20; and
    the ratio of the thickness in a radial direction of the bridging portion to the thickness of laminated steel plates of the tooth portion iron core falls within a range of 0.2 to 1.0.

15. An armature as in claim 14, wherein said motor is a synchronous motor.

16. An armature as in claim 14, wherein said tooth portion iron cores are nine in number.

17. An armature as in claim 16, wherein said rotor has eight poles.

* * * * *